US007734283B2

(12) United States Patent
Sebban

(10) Patent No.: US 7,734,283 B2
(45) Date of Patent: Jun. 8, 2010

(54) INTERNET ACCESSING METHOD FROM A MOBILE STATION USING A WIRELESS NETWORK

(76) Inventor: Mickael Sebban, 46 boulevard Beaumarchais, F-75011 Paris (FR)

( * ) Notice: Subject to any disclaimer, the term of this patent is extended or adjusted under 35 U.S.C. 154(b) by 850 days.

(21) Appl. No.: 11/321,101

(22) Filed: Dec. 29, 2005

(65) Prior Publication Data

US 2007/0206526 A1    Sep. 6, 2007

Related U.S. Application Data

(63) Continuation of application No. PCT/FR2005/003021, filed on Dec. 2, 2005.

(51) Int. Cl.
*H04M 11/10* (2006.01)
(52) U.S. Cl. ..................... 455/414.3; 455/466
(58) Field of Classification Search .............. 455/432.1, 455/435.1, 445, 433; 370/338, 352; 709/227
See application file for complete search history.

(56) References Cited

U.S. PATENT DOCUMENTS

| 5,809,242 | A | 9/1998 | Shaw et al. ............ 395/200.47 |
| 5,848,397 | A | 12/1998 | Marsh et al. .................. 705/14 |
| 5,996,007 | A | 11/1999 | Klug et al. .................... 709/218 |
| 6,259,405 | B1 | 7/2001 | Stewart et al. ............... 342/457 |
| 6,326,918 | B1 | 12/2001 | Stewart ....................... 342/457 |
| 6,339,761 | B1 | 1/2002 | Cottingham .................. 705/14 |
| 6,404,762 | B1 * | 6/2002 | Luzeski et al. ............... 370/352 |
| 6,414,635 | B1 | 7/2002 | Stewart et al. ............... 342/457 |
| 6,442,529 | B1 | 8/2002 | Krishan et al. ................ 705/14 |

(Continued)

FOREIGN PATENT DOCUMENTS

JP    2003030519    1/2003

(Continued)

OTHER PUBLICATIONS

"Google seeks patent for ad-subsidized WiFi access", by Anders Bylund, http://arstechnica.com/news.ars/post/20060324-6455.html, Mar. 24, 2006, 2 pages.

(Continued)

*Primary Examiner*—Charles N Appiah
*Assistant Examiner*—Joy K Contee
(74) *Attorney, Agent, or Firm*—St. Onge Steward Johnston & Reens LLC

(57) ABSTRACT

A method for opening a wireless communication session and providing an end-user with a free Internet session after they view customized content associated with a wireless access point ("Hot Spot"). In a preferred embodiment, an end-user opens an Internet browser after selecting an available "Hot Spot" displayed on their wireless device. The wireless device connects with the chosen "Hot Spot", which then establishes a connection with a management platform controlling authentication and content unique to the "Hot Spot". The management platform then transmits the content via the "Hot Spot" to the wireless device, where it is displayed until expiration of a pre-determined time. After the display expires, the end-user's internet session is opened via automatic authentication by the management platform. This authentication can be triggered either by the click of a login button appearing on the wireless device after the display expires, or by mere expiration of the display.

3 Claims, 2 Drawing Sheets

U.S. PATENT DOCUMENTS

| | | |
|---|---|---|
| 6,452,498 B2 | 9/2002 | Stewart .................... 340/573.1 |
| 6,571,221 B1 | 5/2003 | Stewart et al. ................. 705/52 |
| 6,615,267 B1 * | 9/2003 | Zabolotzky et al. ......... 709/229 |
| 6,697,018 B2 | 2/2004 | Stewart ...................... 342/386 |
| 6,714,797 B1 | 3/2004 | Rautila .................... 455/552.1 |
| 6,732,176 B1 | 5/2004 | Stewart et al. ............... 709/227 |
| 6,795,700 B2 | 9/2004 | Karaoguz et al. ........... 455/408 |
| 6,950,804 B2 | 9/2005 | Strietzel ..................... 705/26 |
| 6,970,927 B1 | 11/2005 | Stewart et al. ............. 709/225 |
| 7,039,423 B2 * | 5/2006 | Daniel et al. ............. 455/456.3 |
| 7,058,594 B2 | 6/2006 | Stewart ...................... 705/14 |
| 7,062,469 B2 | 6/2006 | Meyers et al. ................. 705/64 |
| 7,197,301 B2 * | 3/2007 | Netanel ...................... 455/419 |
| 7,343,158 B2 * | 3/2008 | Mizell et al. ............. 455/435.1 |
| 7,448,068 B2 * | 11/2008 | Sun et al. ........................ 726/2 |
| 2002/0046104 A1 | 4/2002 | Kaddeche et al. ............. 705/14 |
| 2002/0087335 A1 | 7/2002 | Meyers et al. .................. 705/1 |
| 2003/0063581 A1 * | 4/2003 | Shanbhag et al. ........... 370/328 |
| 2004/0123160 A1 * | 6/2004 | Mizrah ....................... 713/202 |
| 2006/0058019 A1 | 3/2006 | Chan et al. ................ 455/422.1 |
| 2006/0059043 A1 | 3/2006 | Chan et al. .................... 705/14 |
| 2006/0059044 A1 | 3/2006 | Chan et al. .................... 705/14 |
| 2006/0276124 A1 * | 12/2006 | Kikkoji et al. ............. 455/3.01 |
| 2008/0026740 A1 * | 1/2008 | Netanel ..................... 455/419 |

FOREIGN PATENT DOCUMENTS

JP    2003067630    3/2003

OTHER PUBLICATIONS

French Search Report, Jul. 12, 2005, 2 pages.
Front Porch Inc., Porch light 525 System Administration instruction manual, Nov. 17, 2004, 9 pages.
Front Porch Inc. Advertising Literature, 2004, 4 pages.

* cited by examiner

INTERNET ACCESSING METHOD FROM A MOBILE STATION USING A WIRELESS NETWORK

CROSS-REFERENCE TO RELATED APPLICATIONS

The present application is a continuation of pending International patent application PCT/FR2005/003021 filed on Dec. 2, 2005, the content of which is in-corporated herein by reference.

FIELD OF THE INVENTION

This invention relates to the field of internet access.

This invention relates in particular to the field of internet access from a mobile station using a wireless network.

BACKGROUND OF THE INVENTION

Wireless Internet accessing methods from access points known as "Hot Spot" have been strongly developed for a number of years. In particular, a number of establishments, such as restaurants, train stations and airports, offer this type of access to users.

In this case, the known methods are as follows:

the user buys an Internet access card from the establishment. An identifier and a password are registered on this card, which are the authentication parameters of the user for the WI-FI session. Using these identifiers, the user can then log in, and, generally, an Internet banner page corresponding to the page of the establishment is displayed.

The user can also pay for this service by debiting his telephone bill by means of a text message (SMS), or directly to an SSL bank Internet session using a credit card.

Such a method is dictated by economic considerations, since the establishment intends to make the user pay for his right of access from its equipment and thus the use of its wireless access Hot Spot point.

In all the known cases of the prior art, this service is charged to the end user.

This invention intends to give a solution to the prior art by providing to the user the possibility of automatically connecting to the Internet from his mobile station, and in addition, free of charge.

The prior art also knows of procedures for supplying free access to wireless networks through advertising.

In particular, document US 2002/087335 (MEYERS) describes a method for displaying advertising content on a user station connected on the wireless network. However, this document does not describe the displaying of these contents according to a predetermined timing, the contents can therefore be provided to the user at any given moment. Thus, nothing ensures that the end user will read or see the content, which is disadvantageous from an economic point of view. In addition, the method described in this document requires a preliminary authentication of the end users before the implementation of the method.

This invention intends to find a solution for these drawbacks.

SUMMARY OF THE INVENTION

This invention relates to a method for the opening of a wireless communication session using at least a management platform, a wireless access point and a user station, a content being associated with at least a wireless access point at the management platform level, said method comprising the steps of:

establishing a connection from the wireless access point to the management platform;

generating a request from the wireless access point to the management platform, said request comprising at least an identifier of said wireless access point;

extracting from said platform the content associated with the identifier;

sending said content to said user station;

displaying said content on the user station;

upon expiration of a preset time that is higher than the duration of the display of said content at the user station level, automatically generating at least an identifier of said user for the opening of a wireless connection session.

Thus, by generating the identifier after displaying the content, the method according to the invention ensures that the end user will read, see or hear the content before logging in, which is advantageous for the contents provider.

The invention can be better understood with reference to the diagrams described below by way of illustration and in a non-restrictive way.

DETAILED DESCRIPTION OF THE INVENTION

Figure 1:
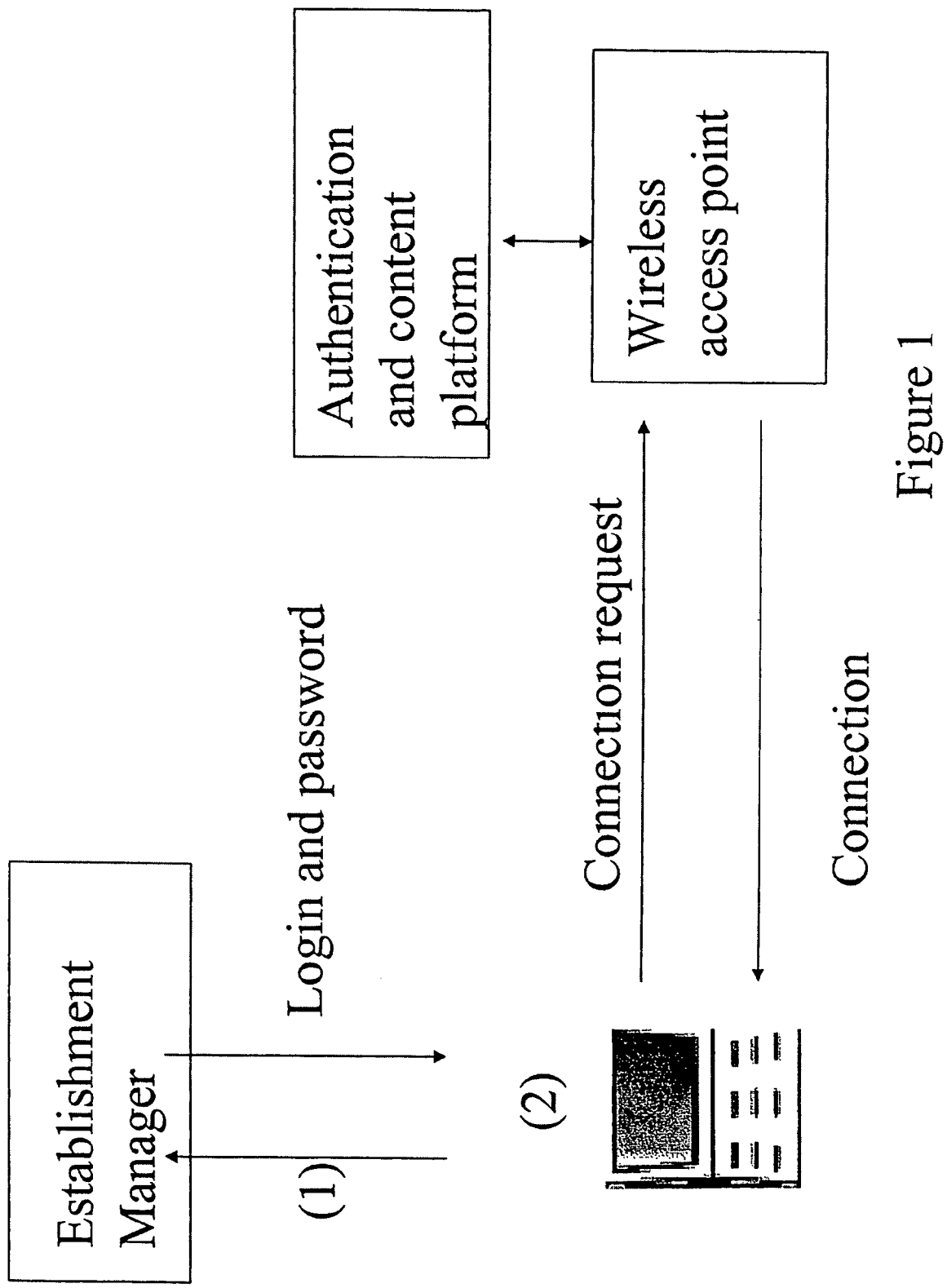
FIG. 1 illustrates the method for opening an Internet session in the establishment offering WI-FI connections according to the prior art.

As illustrated in FIG. 1, and as already explained, user 1 must make a request with the venue manager before obtaining his password and his login information, and log in, on the basis of these identifiers. Most of the time, these identifiers can be read on a pre paid card that reveals the password and login to a single user, or are provided following a subscription to a service. This service is therefore payable and annoying for the end user who cannot get direct access to this connection.

According to the invention, the user no longer needs this pre paid card or this subscription to be able to connect to the Internet over the wireless network.

Figure 2:
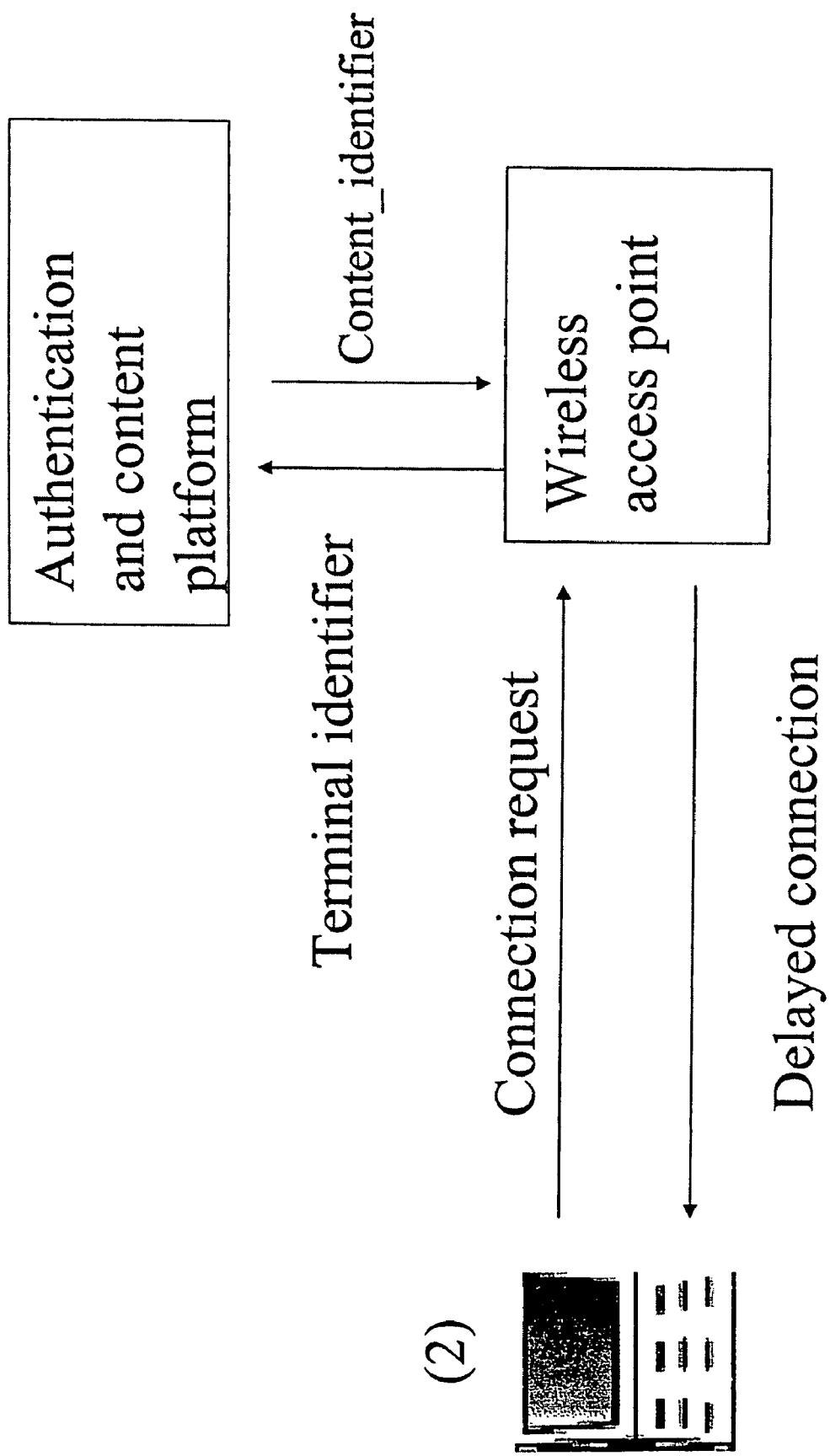
FIG. 2 illustrates the method for opening an Internet session in the establishment offering WI-FI connections according to the invention.

Therefore, as illustrated in FIG. 2, the end user simply turns on the mobile station allowing a WI-FI wireless connection. According to the operating systems used, the available access points are been displayed directly at the station, and the end user can select his access point, thus the desired service. These access points can be selected according to their strength signal, with for example, the strongest signal first. Lastly, it is also possible to manually configure or override a preset access point if this one does not appear on the screen. The end user then launches an Internet browser, for example Internet Explorer, and the mobile station establishes a connection with the selected wireless access point knowed as 'Hot Spot' or 'venue'.

The access point then establishes, conventionally, a connection with the authentication and contents management platform. This platform contains the conventional authentication protocols such as RADIUS protocol. One of the innovative aspects of this invention is the fact that the wireless access point identifies with the contents management platform in order to receive customized contents.

In fact, the management platform comprises an access points identifiers data base to which are associated contents to be displayed.

The contents may be videos, audio content, flash type animations or simply advertising messages.

Following the identification of the access point, the contents database extracts the contents associated with the identifier of the access point. This content is then sent to the access point that transmits it to the mobile station so that it can be displayed on the user station.

Before logging in, the end user therefore sees the contents that are associated with the wireless access point.

According to an embodiment; upon expiration of a predetermined time which can, for instance, depend on the contents display time, a log-in icon, is displayed at the end user station.

When the end user clicks on this log-in icon, the end users' identifier, password and login, are automatically generated at the authentication server, which establishes a connection for the end user's mobile station.

Therefore, the end user can benefit from a wireless internet session freely or at no cost in an establishment without having to be given or delivered any identifier from the venue location.

According to a second embodiment, the end user's identifier is automatically generated without the end user having to click on the log-in icon, after a predetermined time. The connection is then performed after a set time, following the request for connection.

Thus, in both embodiments, the end user must, in order to get the free internet session, visualise beforehand advertising messages, for a predetermined period of time. The advantage of this invention will be obvious, since the establishment that owns the wireless access point, no longer sells access or pre paid cards, but can, instead, send out advertising contents to all the access points individually within WIFI venue coverage area.

The delayed connection according to this invention allows free access to Internet from all types of wireless devices such as PDA, wireless equipment, laptops, telephone . . .

The invention can also be used with different wireless connection protocols, such as a WI-FI or Wi-Max connection, according to the standards being used at the time of the implementation of the invention.

Although the invention has been described through examples referring to the accompanying diagrams, it must be understood that many modifications can be made by a person skilled in the art without departing from the scope of this invention.

What is claimed is:

1. A method for the opening of a wireless communication session using at least a management platform, a wireless access point and a user station, an advertising content being associated with at least a wireless access point at the management platform level, said method comprising the steps of:

establishing a connection from the wireless access point to the management platform;

generating a request from the wireless access point to the management platform, said request comprising at least an identifier of said wireless access point;

extracting from said platform the advertising content associated with the identifier;

sending said advertising content to said user station;

displaying said advertising content at the user station;

upon expiration of a preset time that is higher than the duration of the display of said advertising content at the user station level, thereby forcing said user to view said content for at least said preset time, automatically generating at least an identifier, password and login of said user;

opening a wireless connection session employing at least said automatically generated identifier, password and login of said user.

2. A method for opening a wireless communication session according to claim 1, further comprising a step of displaying a log-in icon at the user station upon expiration of said preset time, and wherein said opening a wireless connection session step is performed upon the user activating the log-in icon.

3. A method for opening a wireless communication session according to claim 1, wherein, said opening a wireless connection session step is automatically performed upon expiration of said preset time.

* * * * *